Feb. 14, 1961    R. C. NEWHOUSE    2,971,269
VECTORING PHASE SIMULATOR
Filed Jan. 18, 1957    2 Sheets-Sheet 1

INVENTOR.
RUSSELL C. NEWHOUSE
BY
R. J. Tompkins
ATTORNEYS

INVENTOR
RUSSELL C. NEWHOUSE

BY
R. I. Tompkins
ATTORNEYS

United States Patent Office 2,971,269
Patented Feb. 14, 1961

2,971,269

VECTORING PHASE SIMULATOR

Russell C. Newhouse, Short Hills, N.J., assignor, by mesne assignments, to the United States of America as represented by the Secretary of the Navy Filed Jan. 18, 1957, Ser. No. 635,079

3 Claims. (Cl. 35—10.2)

The present invention relates to a vectoring phase simulator and more particularly to a simulator for evaluating and optimizing the characteristics of manual, semi-automatic and automatic interceptor vectoring systems.

The term "vectoring phase" refers to that portion of a target interception which takes place after the interceptor has been launched but before lock-on of the interceptor's AI (Aircraft Interception) radar. During this phase, the interceptor is directed (i.e. vectored) to intercept the target in accordance with the positions and courses of the target and the interceptor with respect to a control center. The position and course of the target may be determined by vectoring radar and the position and course of the interceptor may be determined either by vectoring radar or by a navigational aid such as VOR-DME.

The ability of an interceptor to detect and successfully intercept a target depends largely upon the accuracy with which it can be vectored to a tally-ho position where the target may be observed on its AI radar. If it were possible to direct an interceptor to any particular point with negligible error by means of vectoring radar alone, it is obvious that AI radar would be superfluous. Without such perfect control, the required performance of the AI radar is very dependent on the behavior of the interceptor vectoring system. If, on the other hand, the range at which the interceptor's AI radar is able to detect and lock-on a target were not limited, a vectoring system might not be needed or at least the accuracy of the vectoring system would be unimportant because there would be an adequate amount of time for the interceptor to make any necessary corrections in its intercepting course. However, the desirability of a forward hemisphere attack coupled with the high speeds of modern aircraft results in AI radar range requirements that exceed the limits of the current radar art. In order to relax AI radar range requirements, it is necessary to vector the interceptor to a tally-ho position with a considerable degree of precision so that it will be in a favorable position and attitude to complete the interception in the remaining available time.

Vectoring radars usually rotate at rates between four and twenty r.p.m. and hence get new data on the positions of a target and/or an interceptor every fifteen to three seconds. This period is called the "data interval" and the number of data intervals per unit of time is termed the "data rate." It is obvious that position data errors related to the data interval will occur. These errors and other random fluctuations in target or interceptor position data are termed "radar noise." Other position data errors occur in any practical system because of time lags (phase delay) caused by smoothing networks which are needed to compensate for noise and the quantizing effect of periodic data acquisition. The success of the vectoring phase, i.e., how well the interceptor is positioned and headed at the time of AI radar lock-on, depends largely upon how well the vectoring system is able to compensate for and minimize position errors in data processing and prediction. Stated in other terms, the effectiveness of a vectoring system depends upon how closely it approximates a noise-free vectoring system having continuous data input, processing, and prediction.

The present invention permits real time, two dimensional simulation of target interceptions in a horizontal plane and is capable of utilizing actual equipment and human operators to permit simulation of manual, semi-automatic, and automatic vectoring systems. Interceptor vectoring in a vertical plane is normally accomplished by directing the interceptor to an altitude selected in accordance with the nature of the interceptor's armament.

The simulator comprises essentially a target position generator, a radar simulator, a vectoring computer, an interceptor position generator, and a plotting board where the tracks of the target and the interceptor are displayed. The target position generator, the vectoring computer, and the interceptor position generator are coupled together by appropriate data transmission links. In addition to the plotting board appropriate display indicators are provided which may be photographed.

Vectoring computers suitable for use in semi-automatic or automatic vectoring systems are described in co-pending application Serial No. 635,078 for Proportional Navigational Navigational Computer, filed Jan. 18, 1957, and in co-pending application Serial No. 678,749 for Collision Course Computer, filed Aug. 16, 1957.

Vectoring systems are essentially sampled data control systems. Reference is made to a paper entitled A Simulator for Analysis of Sampled Data Control Systems by Paul Karl Giloth delivered at the National Simulation Conference held January 19, 1956, for a general discussion of various problems presented in the simulation of sampled data control systems and methods whereby these problems may be solved. It is intended that the subject matter of this paper be incorporated into the present application; but, in order to avoid burdening this specification with theoretical considerations, only certain portions of the paper will be specifically referred to below in the description of an illustrative embodiment of the invention.

One old method of evaluating vectoring systems and methods involved the point by point plotting of target and interceptor positions and correcting the course of the interceptor at each plot. This method, in addition to being prohibitively time consuming, made the examination of the effects of high data rates impracticable. Further, it was not feasible to perform the larger number of interceptions required to provide sufficient data for the statistical evaluation of the effects of radar noise.

Accordingly, it is an object of the present invention to provide a vectoring phase simulator whereby optimum vectoring methods may be determined.

It is another object of the present invention to provide a vectoring phase simulator whereby the optimum form of a vectoring system and the optimum parameters thereof may be determined.

A further object of the present invention is to provide a vectoring phase simulator whereby the optimum form and the optimum parameters of a vectoring computer may be determined.

Still another object of the present invention is to provide a vectoring phase simulator whereby the effects of radar noise and data rates on vectoring systems may be determined.

A still further object of the present invention is to provide a vectoring phase simulator whereby the acceptable time lags in a vectoring system may be determined.

It is a final object of the present invention to provide a vectoring phase simulator whereby the lower limit of acceptable maximum AI radar range may be determined.

Other objects and many of the attendant advantages of this invention will be readily appreciated as the same becomes better understood by reference to the following detailed description when considered in connection with the accompanying drawings wherein.

Figure 1:
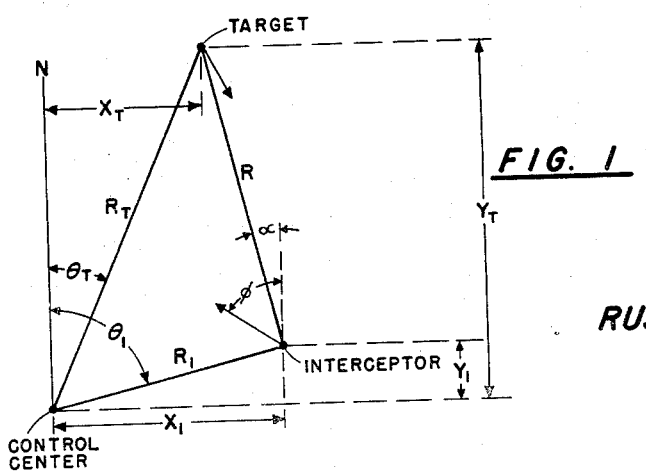
Fig. 1 is a vector diagram illustrating the geometry of the interception problem.

Referring now to Fig. 1, $R_T$ and $\theta_T$ represent the range and azimuth of a target with respect to a control center; $R_I$ and $\theta_I$ represent the range and azimuth of an interceptor with respect to the control center; R and $\alpha$ represent the range and azimuth of the target with respect to the interceptor; and $\phi$ represents the interceptor heading. As may be seen from Fig. 1 the position of the target may be expressed in rectangular co-ordinance as $X_T$ and $Y_T$, while the position of the interceptor may be expressed in rectangular co-ordinates as $X_I$ and $Y_I$.

Vectoring computers of the type described in the above referenced co-pending applications operate upon input signals proportional to the co-ordinates of the target and the interceptor to provide a bearing order for the interceptor which may be applied to the interceptor's autopilot or may be visually displayed for the pilot's guidance or both. In a proportional navigational computer a bearing order is provided that is proportional to the rate of change of the line of sight, $\alpha$, between the target and the interceptor while in a collision course computer a bearing order is provided to direct the interceptor along a straight line course (appropriately corrected for wind, compass, and position errors) which will bring the interceptor into collision with the target at a predicted time and place.

Figure 2:
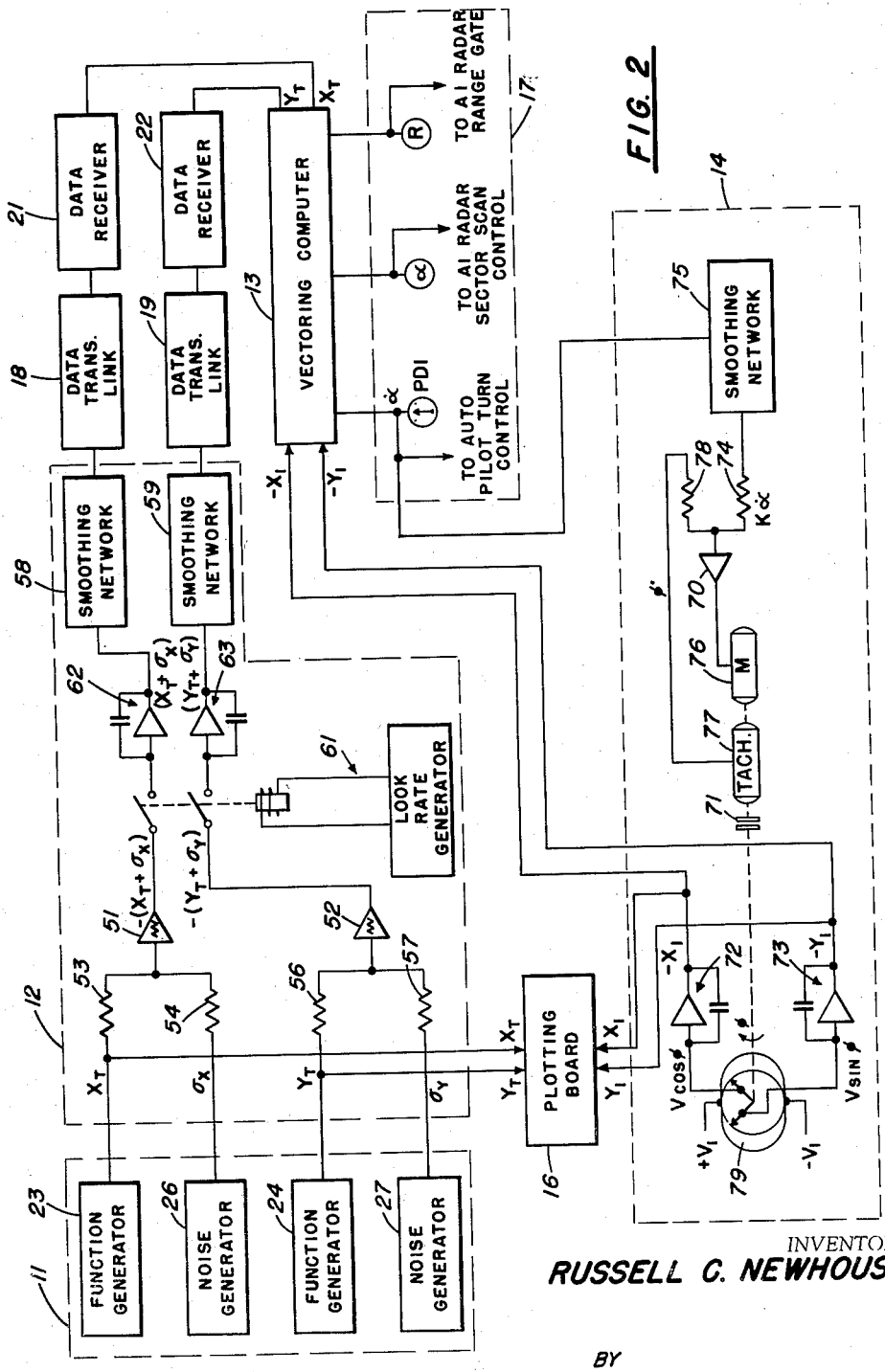
Fig. 2 illustrates an embodiment of the invention partly in schematic and partly in block diagram form.

Referring now to Fig. 2 there is shown a target position generator 11, a simulated radar system 12, a vectoring computer 13, an interceptor position generator 14, a commercial type plotting board 16 having a pair of two co-ordinate plotting pen carriages and an indicator display panel 17. Vectoring computer 13 is coupled to the simulated radar system 12 by data transmission links 18, 19 and data receivers 21, 22.

The target position generator 11 comprises programmed teletype operated units to provide signals representing the instantaneous position of a target expressed in rectangular co-ordinates and signals proportional to random fluctuations in the position of a target (radar noise). The noise-free output of target position generator 11 is applied to one pen carriage of plotting board 16.

The simulated radar system 12 accepts the signals from the target position generator and provides output signals proportional to target position data such as would be obtained from:

(1) An operator recording the position of a target on each scan of a search radar, or (2) An operator manually adjusting rate and position controls to track the target on a search radar display, or (3) The output of an automatic track-while-scan computer receiving data from a search radar.

Vectoring computer 13, for example, may be of the proportional navigation type which in response to input signals proportional to target and an interceptor position data provides output signals proportional to the angle of the line of sight between the interceptor and the target, the rate of change of the angle of the line of sight, and the range of the target with respect to the interceptor.

Data transmission links 18, 19 and data receivers 21, 22 may comprise actual equipment, circuits simulating such actual equipment, or a human operator.

Interceptor position generator 14 is operative in response to reception of bearing order signals from vectoring computer 13 to provide output signals representing the instantaneous position of an interceptor in rectangular co-ordinates. The output signals from interceptor generator 14 are fed back to vectoring computer 13 to form a closed servo loop and to plotting board 16 to actuate the other pen carriage of plotting board 16.

Display panel 17 to which is applied the output signals from vectoring computer 13 may comprise actual aircraft indicator equipment or other suitable display instrumentation and may include appropriate photographic equipment.

Figure 3:
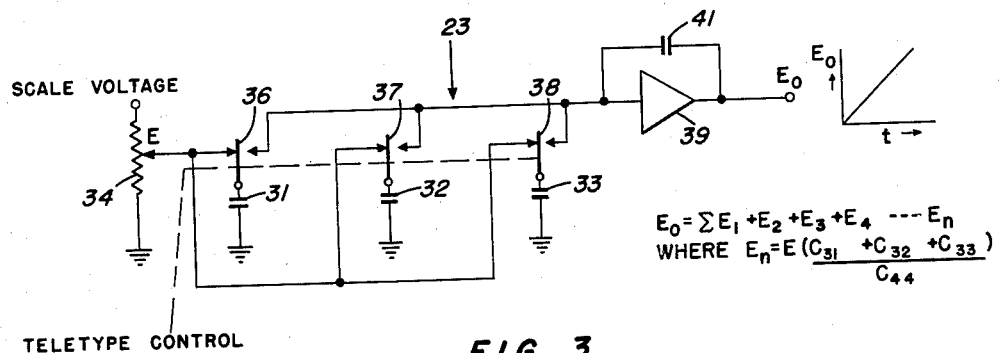
Fig. 3 illustrates the function or track generators shown in block diagram form in Fig. 2.

In Fig. 3 there is shown an embodiment of function or track generators 23, 24. Capacitors 31, 32, and 33 are charged from a potentiometer 34 to which is applied a scale voltage from a source not shown. One terminal of each of capacitors 31, 32, 33 is connected to ground while the other terminals thereof are respectively connected to the movable contact members of relays 36, 37, and 38. One stationary contact on each of relays 36, 37 and 38 is connected to the wiper arm of potentiometer 34 while the other stationary contacts thereof are connected to the input circuit of an integrator circuit comprising an operational amplifier 39 and a capacitor 41 connected in parallel therewith. Relays 36, 37 and 38 are operated by teletype units (not shown) which are programmed by punched tapes. It may be seen that generators 23, 24 are essentially tape-code to analog converters wherein the charge on selected capacitors is transferred to a sample and hold circuit. As shown in Fig. 3 the output voltages $E_0$, from generators 23, 24 comprise time variable voltages equal to the sum of successive arbitrarily chosen incremental voltages. Generators 23, 24 are capable of producing output signals corresponding to any arbitrarily chosen target track and are capable of reproducing the chosen track voltages as often as may be required. While not shown, quantizing and dequantizing circuits, which may be of the type described in the above mentioned paper, may be included in function or track generators 23, 24.

Figure 4:
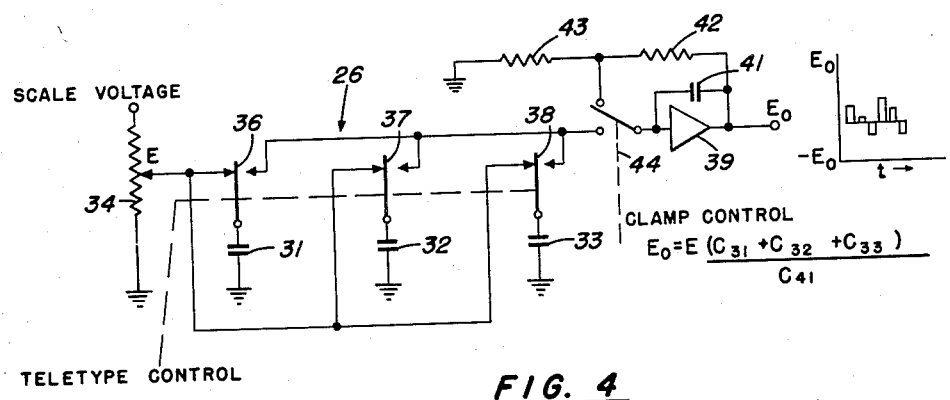
Fig. 4 illustrates the noise or data error generators shown in block diagram form in Fig. 2.

Fig. 4 illustrates an embodiment of noise or data error generators 26, 27. Generators 26, 27 in many respects are similar to generators 23, 24 and corresponding parts have been indicated by the same reference numerals. In addition to the circuitry embodied in generators 23, 24, generators 26, 27 further include a clamping circuit comprising resistors 42, 43 and a clamping relay 44. In Fig. 4, relays 36, 37, 38, and 44 are operated by teletype units (not shown) which are programmed by tapes punched in accordance with a standard table of random numbers. Since generators 26, 27 are clamped to ground between each sample, the output voltages therefrom comprise data error rather than increments of data error. In Fig. 4, it may be seen that the output voltages, $E_0$, from generators 26, 27 comprise a series of random pulses of duration $t$ and having amplitudes proportional to the product of the input voltage and the ratio of the sum of the selected one or ones of capacitors 31, 32, 33 to capacitor 41. Generators 26, 27 permit convenient and accurate control of the standard deviation of data error and permit any particular set of random data error samples to be repeated.

Referring again to Fig. 2, radar simulator 12 may comprise a pair of operational amplifiers 51, 52 having the input circuits thereof coupled to function generators 23, 24 and to noise generators 26, 27 by input resistors 53, 54, 56, and 57 and the output circuits thereof coupled to smoothing networks 58, 59 through a "look rate" generator 61 and integrators 62, 63.

The "look rate" generator is actuated by tape programmed teletype units (not shown) and simulates the rotation or scanning rate of a vectoring radar by transmitting target position information only when it "scans" the target, i.e., when the relay contacts thereof are closed (which may, for example, be every six seconds if the "look rate" generator is programmed to simulate a vectoring radar having a rotational or scanning rate of ten r.p.m.). Look rate generator 61 and integrating circuits 62, 63 may also comprise the switching and sample and hold or fractional sampling circuits described in the above referenced paper.

Smoothing networks 58, 59 may comprise static networks, tape programmed sampling or processing circuits of the type described in the above mentioned paper, or other suitable circuits. The purpose of smoothing networks 58, 59 (and 75, to be described below) is to provide smooth, noise free data. The design of these networks must take into consideration the conflicting requirements of minimizing system delay and optimizing the separation of noise signals from signals proportional to the actual present or future position of the target or the interceptor. The problem is further complicated by the fact that noise rejection filters are low pass filters and will therefore attenuate the high frequency components present in the true position data signals of a maneuvering target or an interceptor as well as noise signals. One of the functions of the present invention is to provide a means to obtain data to aid in optimizing the characteristics of smoothing networks required in vectoring systems having intermittent data inputs.

Vectoring computer 13, as mentioned above, may comprise, for example, either a proportional navigation computer or a collision course computer. Illustrative embodiments of both are described in the above referenced co-pending applications. As explained above, the proportional navigation computer, shown for example in the embodiment of the present invention illustrated in Fig. 2, operates upon input position data signals to provide output signals proportional to target range and azimuth and to the rate of change of target azimuth. The rate of change of azimuth signal is supplied as a bearing order to the interceptor (target position generator 14 and display panel 17 in the simulator) while the range and azimuth signals are respectively supplied to the range gate and to the sector scan control of the interceptor's AI radar (display panel 17 in the simulator).

Display panel 17, as mentioned above, may comprise actual aircraft equipment or merely appropriate display instrumentation and in either case may be provided with high speed photographic equipment.

Interceptor position generator 14 includes a velocity servo loop which integrates the bearing order from vectoring computer 13 to obtain a shaft position (selected to represent the interceptor heading) which is proportional to the integral of the bearing order and a feedback voltage proportional to the rate of change of the interceptor heading. The velocity servo loop comprises an operational amplifier 70 having the input circuit thereof coupled through a resistor 74 and smoothing network 75 to vectoring computer 13, a motor tachometer-generator set 76, 77 coupled to the output circuit of amplifier 70, and a velocity feedback circuit including a resistor 78. The feedback and bearing order signals are, in the usual manner, applied differentially to amplifier 70. A clutch 71 is provided to supply the integration constant (the initial interceptor heading). Smoothing network 75 may be similar to smoothing networks 58, 59 or may be a simple exponential filter. The factor K shown in Fig. 2 adjacent resistor 74 is a proportionality constant determined by the gain of amplifier 70 and represents a navigation constant in the vectoring system simulated. In an actual vectoring system, the magnitude of the navigation constant is dependent upon the relative velocities of the target and the interceptor and system gain. On the opposite side of clutch 71 from tachometer 77 is a sine-cosine potentiometer 79, the two wiper arms of which are driven by the shaft from the clutch at a rate proportional to $\phi$, the interceptor heading. Voltages $+V_1$ and $-V_1$, of a magnitude representative of the velocity of the interceptor, are impressed across the sine-cosine potentiometer 79, so as to produce outputs equal to $V \cos \phi$ and $V \sin \phi$, or in other words the heading of the interceptor in rectangular coordinates. Connected to the output terminals of the potentiometer 79 are two integrators 72 and 73 which operate on the $V \cos \phi$ and $V \sin \phi$ outputs of the potentiometer 79 to indicate the actual position of the interceptor as values $X_1$ and $Y_1$. These values of $X_1$ and $Y_1$ are then in turn fed to one pen of the plotting board 16, and also to the vectoring computer 13 to complete the velocity servo loop.

While not shown, a second vectoring computer may be included in the simulator and have applied thereto noise-free data in order to permit a comparison between a noisy and a noise-free solution of an interception problem to facilitate analysis of the effects of noise and system delay. Further, the interceptor position generator may include additional circuitry to simulate the characteristics of a particular aircraft and may further include circuitry which functions as a turning rate limiter to avoid exceeding, in simulation, the capabilities of a real aircraft.

Obviously many modifications and variations of the present invention are possible in the light of the above teachings. It is therefore to be understood that within the scope of the appended claims the invention may be practiced otherwise than as specifically described.

What is claimed is:

1. A vectoring phase simulator comprising: target position data signal generating means; noise signal generating means; a radar simulator; circuit means coupling said radar simulator to said target position data signal generating means and to said noise signal generating means; a proportional navigation computer operative to provide a bearing order signal; an interceptor position data signal generating means comprising an electro-mechanical velocity servo loop, a sine-cosine potentiometer having the wiper arms thereof mechanically coupled to said electro-mechanical velocity servo loop to be actuated thereby, means to apply to the resistive portions of said sine-cosine potentiometer voltages proportional to the magnitude of the velocity of the simulated interceptor, and integrator means having the input circuit thereof coupled to said wiper arms; circuit means coupling the input circuit of said proportional navigation computer to said radar simulator and to the output circuit of said integrator means; circuit means coupling the bearing order signal from said proportional navigation computer to the input circuit of said electro-mechanical servo loop; display means; and circuit means coupling said display means to said target position data signal generating means and to the output circuit of said integrator means.

2. The simulator of claim 1 wherein said display means comprises a two pen plotting board whereby the simulated tracks of said target and said interceptor may be graphically displayed.

3. The simulator of claim 2 wherein there is further provided a second display means coupled to said proportional navigation computer to indicate the operation thereof.

References Cited in the file of this patent

UNITED STATES PATENTS

| | | |
|---|---|---|
| 2,439,169 | Kittredge | Apr. 6, 1948 |
| 2,475,314 | Dehmel | July 5, 1949 |
| 2,560,527 | Dehmel | July 10, 1951 |
| 2,569,328 | Omberg | Sept. 25, 1951 |
| 2,602,243 | Link | July 8, 1952 |
| 2,604,705 | Hisserich | July 29, 1952 |
| 2,652,636 | Garman et al. | Sept. 22, 1953 |
| 2,669,033 | Brown | Feb. 16, 1954 |
| 2,693,647 | Bolster et al. | Nov. 9, 1954 |
| 2,714,047 | Dehmel | July 26, 1955 |
| 2,744,339 | Paine | May 8, 1956 |

OTHER REFERENCES

Electronics, September 1953, pages 137–139.